July 24, 1934.  J. S. DUNN  1,967,874
PURIFICATION OF SULPHUR
Filed May 4, 1932
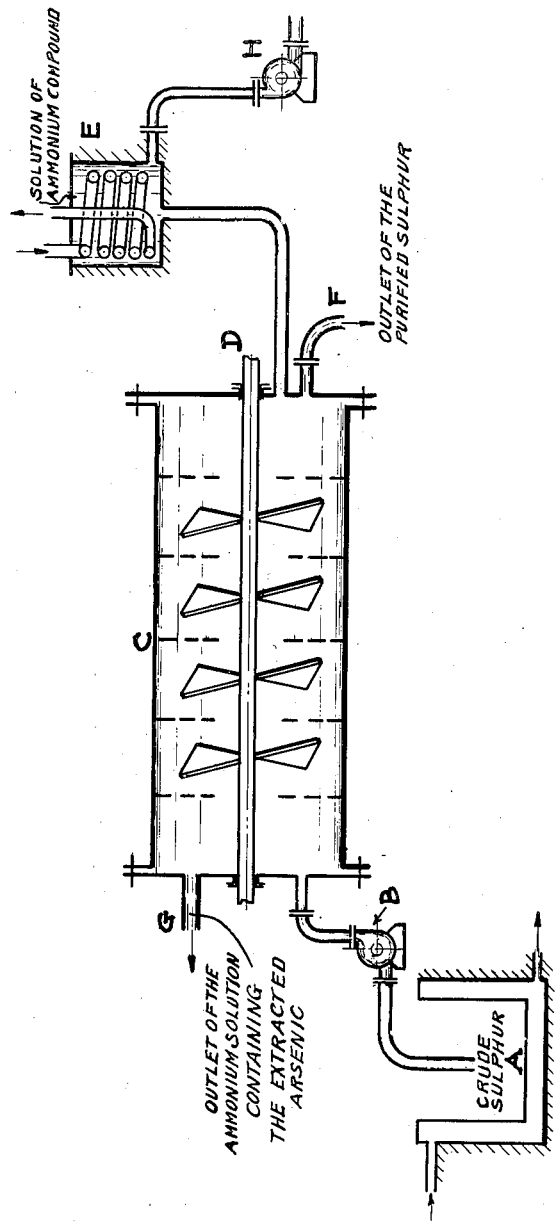
INVENTOR.
JOHN STANLEY DUNN
BY
ATTORNEY.

Patented July 24, 1934

1,967,874

UNITED STATES PATENT OFFICE 1,967,874

PURIFICATION OF SULPHUR

John Stanley Dunn, Norton-on-Tees, England, assignor to Imperial Chemical Industries Limited, London, England, a British company Application May 4, 1932, Serial No. 609,168
In Great Britain May 26, 1931

3 Claims. (Cl. 23—224)

This invention relates to the purification of sulphur and to the production of arsenic free sulphur.

According to the invention, crude sulphur is purified by digestion with a solution of a volatile ammonium compound such as ammonia, ammonium sulphide or ammonium carbonate.

The process is preferably applied to sulphur in liquid form. Thus, for instance, molten sulphur may be treated at suitable temperatures and under pressure with the ammonia or ammonium salt solution. Any known method whereby the reacting materials are brought into intimate contact with one another may be employed. For instance, when using molten sulphur the liquids may be caused to flow in counter-current.

The arsenic may be recovered in the form of arsenic sulphide by the addition of a mineral acid to the wash liquor and if desired the residual solution containing ammonium salts may then be distilled with lime and the ammonia returned to the process.

Reaction occurs between the ammonia or ammonium salt and the arsenic which is present in the sulphur as arsenious sulphide, and a soluble ammonium thioarsenate is formed according to the equation:

$$3(NH_4)_2S + As_2S_3 + S_2 = 2(NH_4)_3AsS_4$$

The sulphur is then separated from the aqueous solution of the thioarsenate, washed and dried.

Example 20 gms. of sulphur containing about 0.5 per cent. of arsenic were treated four times in succession with a solution of 0.14 gms. of ammonia in 20 c. c. of water at a temperature of 130° C. and under 3-4 atmospheres pressure. The arsenic content of the sulphur was reduced to less than 0.75 gms. per million.

The accompanying drawing illustrates diagramatically an arrangement of apparatus suitable for carrying out the invention on a commercial scale.

Molten sulphur to be purified is stored in a steam heated tank A the sulphur being maintained at 120–130° C. From this collecting tank it is pumped by a small steam jacketed pump B to the washer C against a pressure of about 40 lb./in.² The washer consists of a closed horizontal tank about 30–40' long by 6–8' diameter divided into a number of compartments by perforated partition plates. A horizontal agitator shaft D passes through the whole length of the washer carrying agitator blades in each compartment except the first and last. Introduced at the other end from tank E under pressure by pump H and flowing counter current to the molten sulphur, is a 1% solution of aqueous ammonia, or other volatile ammonium compound such as ammonium sulphide or ammonium carbonate preferably heated by steam coils to 130° C. The washed sulphur leaves the washer at the liquor inlet end by outlet pipe F and liquor containing the extracted arsenic leaves at the sulphur inlet end by pipe G. The dissolved arsenic may be recovered as arsenic sulphide by adding acid to the exit liquor.

The purified sulphur is dried by heating and this step also removes residual traces of ammonia.

The use of ammonia, ammonium sulphide or ammonium carbonate to eliminate the arsenic is much more advantageous than the use of fixed alkalis since the ease with which the ammonia can be recovered and recirculated permits a continuous process to be adopted. The volatility of the purifying agent also prevents contamination of the sulphur with the same.

The liquor from which arsenic sulphide has been recovered may, if desired, be treated for recovery of ammonia for further use in the purification process. To this end it is treated with lime or other suitable reagent and distilled, the residual liquor being run to waste and the ammonia being re-cycled to the process together with the addition of any make up of ammonia as and when required. If desired the recovery of arsenic may be effected after the liquor has been treated for ammonia recovery.

Having now particularly described and ascertained the nature of my said invention and in what manner the same is to be performed, I claim:

1. The process of purifying sulphur containing a compound of arsenic and sulphur, which comprises dissolving said compound of arsenic and sulphur at elevated temperature in an aqueous, dilute solution of a compound of the group consisting of ammonia, ammonium sulphides and ammonium carbonates and separating by decantation said aqueous solution from said sulphur.

2. The process of purifying sulphur containing a compound of arsenic and sulphur which comprises dissolving said compound of arsenic and sulphur at a temperature of about 120 to 130° C. and at super-atmospheric pressure in an aqueous, dilute solution of a compound of the group consisting of ammonia, ammonium sulphides and ammonium carbonates and separating by decantation said aqueous solution from said sulphur.

3. A cyclic process of purifying sulphur containing a compound of arsenic which comprises dissolving said compound of arsenic at elevated temperature in a dilute solution of a compound of the group consisting of ammonia, ammonium sulphides and ammonium carbonates, separating by decantation said solution from said sulphur, recovering the ammonium compound by distillation of said separated solution and re-using it for dissolving an arsenic compound from a sulphur containing such arsenic compound.

JOHN STANLEY DUNN.